(12) United States Patent
Kawabe

(10) Patent No.: US 7,889,451 B2
(45) Date of Patent: Feb. 15, 2011

(54) MAGNETIC RECORDING APPARATUS AND CLOCK SIGNAL GENERATING METHOD

(75) Inventor: Takayuki Kawabe, Kawasaki (JP)

(73) Assignee: Toshiba Storage Device Corporation, Tokyo (JP)

(*) Notice: Subject to any disclaimer, the term of this patent is extended or adjusted under 35 U.S.C. 154(b) by 4 days.

(21) Appl. No.: 12/511,829

(22) Filed: Jul. 29, 2009

(65) Prior Publication Data

US 2009/0284858 A1 Nov. 19, 2009

Related U.S. Application Data

(63) Continuation of application No. PCT/JP2007/054506, filed on Mar. 8, 2007.

(51) Int. Cl.
*G11B 5/09* (2006.01)

(52) U.S. Cl. .......................... 360/51; 360/31

(58) Field of Classification Search .................. None
See application file for complete search history.

(56) References Cited

U.S. PATENT DOCUMENTS 6,754,017 B2 * 6/2004 Rettner et al. .................. 360/51

7,133,229 B2 * 11/2006 Semba .......................... 360/51

FOREIGN PATENT DOCUMENTS

| JP | A 2000-48303 | 2/2000 |
| JP | A 2003-281701 | 10/2002 |
| JP | A 2006-164349 | 6/2006 |
| JP | A 2006-244550 | 9/2006 |

* cited by examiner

*Primary Examiner*—Jason C Olson
(74) *Attorney, Agent, or Firm*—Greer, Burns & Crain, Ltd.

(57) ABSTRACT

According to an aspect of the embodiment, in a magnetic recording apparatus having a magnetic recording medium of a patterned media system, a voltage generated between both terminals of a magnetic field generating coil in a case that a DC current is supplied to a recording element of a magnetic head is measured by a voltage measuring circuit in order to perform accurate recording at the center of each of magnetic body regions sectioned with non-magnetic body regions. Based on the measured voltage, a change in coil inductance in passage of the magnetic head over a magnetic body region and a non-magnetic body region in a patterned media is detected by a voltage change detecting circuit. A write clock signal which synchronizes with the change in coil inductance is generated by a clock signal generating circuit.

7 Claims, 12 Drawing Sheets

WPLL: DC MAGNETIZATION REGION FOR WRITE-CLOCK GENERATION
RPLL: PREAMBLE REGION FOR READ-CLOCK GENERATION
DATA: DATA REGION

TIME CHART FOR WRITE OPERATION

TIME CHART FOR READ OPERATION

MAGNETIC RECORDING APPARATUS AND CLOCK SIGNAL GENERATING METHOD

CROSS-REFERENCE TO RELATED APPLICATIONS

This is a continuation application of PCT application serial number PCT/JP2007/054506, filed on Mar. 8, 2007.

FIELD

The embodiments discussed herein are related to a magnetic recording apparatus and a clock signal generating method.

BACKGROUND

FIG. 14 illustrates a control block diagram of a conventional magnetic recording apparatus.

As illustrated in FIG. 14, for example, a magnetic recording apparatus 100 includes a magnetic recording medium 130 of a magnetic disk, a magnetic head 110 that performs recording and reproduction, a head positioning mechanism (VCM) 111 that positions the magnetic head 110, a read amplifier 112 that makes a signal from a reproduction device of the magnetic head 110 a reproduction signal, a write amplifier 113 that drives a recording element of the magnetic head 110 according to a write signal, a disk controller circuit 114, a read channel circuit 115, a positioning control circuit 116, a driving circuit (power amplifier) 117, and an oscillator 120. The disk controller circuit 114 receives a record or reproduction command from a host computer 140, calculates and controls a signal to be recorded in the magnetic recording medium 130, and returns a reproduced data signal from the magnetic recording medium 130 to the host computer 140 as a data bit string. The read channel circuit 115 demodulates the reproduction signal from the magnetic recording medium 130 to generate a data signal or a servo signal, and modulates the data signal received from the disk controller circuit 114 in a manner appropriate for recording in the magnetic recording medium 130, to generate a record signal which synchronizes with a write clock pulse. The positioning control circuit 116 outputs a control signal for positioning the magnetic head 110 based on the servo signal which is demodulated in the read channel circuit 115. The driving circuit 117 converts a drive signal outputted from the positioning control circuit 116 into a current, to drive the head positioning mechanism 111. The oscillator 120 supplies the read channel circuit 115 with the write clock pulse.

In the above conventional practice, the write clock pulse that gives a timing to operate the write amplifier 113 is typically generated by using the oscillator 120 with a fixed frequency, and supplied to the read channel circuit 115.

The trend toward smaller size of a magnetic disk apparatus is apparent in recent years. With this trend, there is a demand for the development of a high-density recordable disk medium. However, in the improvement of the recording density of the magnetic disk apparatus, it becomes a problem to prevent interference from adjacent recording bits.

Under recognition of such problem, a technique called discrete track recording is proposed, which is a technique of physically sectioning each record track of the magnetic disk medium, against interference in a diametrical direction of the magnetic disk medium, to reduce the interference from adjacent tracks.

Further, under the recognition of the above problem, a technique called "patterned media" is also proposed, which is a technique of also physically sectioning the medium, in other words, a technique of patterning each recording bit, against interference in a rotating direction of the magnetic disk medium, to reduce the interference from adjacent bits.

Even when the problem to prevent the interference from adjacent recording bits can be solved, it is necessary for the practical use thereof to accurately position a magnetic head on the medium which is made finer. It is therefore necessary to overcome both the problem to prevent the interference from adjacent recording bits and the problem to accurately position the magnetic head on the medium which is made finer.

Particularly, with regard to positioning in the rotating direction, in other words, means for accurately performing recording or reproduction at the center of each of the sectioned media, it is necessary to detect or predict a timing of passage of the recording and reproduction head over a magnetic body region, and to generate a clock signal which synchronizes with an arrangement pattern of the magnetic body region.

As a technique for generating this clock signal, for example, Patent Document 1 proposes a magnetic recording apparatus that detects a leakage magnetic field generated in recording in a non-magnetic body region, and correct a phase shift of the clock signal.

Further, Patent Document 2 proposes a magnetic recording apparatus that performs recording and reproduction while shifting a phase of a clock signal, and select a phase with which the most favorable error rate is obtained.

Patent Document 1: Japanese Laid-Open Patent Publication No. 2003-281701

Patent Document 2: Japanese Laid-Open Patent Publication No. 2006-164349

For generation of the clock signal which synchronizes with the arrangement pattern of each of magnetic body regions, for example, according to the Patent Document 1, a leakage magnetic field generated in recording in each of non-magnetic body regions is detected to correct a phase shift of the clock signal. However, the method described in Patent Document 1 has a problem that it is impossible to compensate a phase shift when the leakage magnetic field is not accurately detected.

Further, the method of Patent Document 2 has a problem as follows. It is generally required for a recording operation in the magnetic recording apparatus to perform promptly after reception of a recording command from a host computer. However, in the method of Patent Document 2, an optimum phase shift amount is obtained by a trial by measurement of an error rate, so that it is impossible to perform the recording operation immediately after the reception of the recording command. And, it is needed for avoiding this to hold a previously measured phase shift amount in a memory, and reuses it when the apparatus is operated.

However, the magnetic recording mediums mounted in the apparatus are often clamped by frictional force to a turn table of a spindle motor that rotates the medium. In this case, the magnetic recording medium may rotate against the turn table due to impact of some kind to cause a change in optimal phase shift amount. As a result, the phase shift amount cannot be reused which is previously measured and held in the memory. Further, the optimal phase shift amount itself may be changed by mechanical shrinkage and expansion of the medium due to a change of environmental temperature.

In the above circumstances, the phase shift amount is to be repeatedly measured, so that significant deterioration in performance of the apparatus is caused in the method described in Patent Document 2.

Further, due to an influence of a change in decentering of the magnetic recording medium, a rotational jitter of the turn table, or the like, a frequency of the clock signal may be shifted from an estimated value.

Each of the methods described in Patent Document 1 and Patent Document 2 is a method for detecting a phase shift, but a method for detecting a frequency shift is not referred to therein.

SUMMARY

Accordingly, the present invention seeks a solution of the above problems. It is an object to realize a magnetic recording apparatus and a clock signal generating method which are capable of generating a clock signal having both of an optimum phase and an optimum frequency with respect to a patterned magnetic body in real time at recording operation.

According to an aspect of the embodiment, a magnetic recording apparatus includes a magnetic recording medium provided with a plurality of recording dots physically sectioned with each other; a recording element having a magnetic field generating coil, and recording data in the magnetic recording medium; a voltage measuring circuit measuring a voltage generated between both terminals of the magnetic field generating coil; a voltage change detecting circuit detecting a change of the voltage to generate a clock pulse based on the change of the voltage; and a clock signal generating circuit generating a write clock signal which synchronizes with the clock pulse.

According to the above structure, based on the voltage generated between both terminals of the coil in a case that a DC current is supplied to the recording element of a magnetic head, a change in coil inductance is detected, when the magnetic head passes over each of magnetic body regions and non-magnetic body regions in a patterned media. And, based on this detection, a write clock signal is generated. Recording is performed by using this write clock signal, so that it is possible to accurately record the data at a center of each of the magnetic body regions sectioned with the non-magnetic body regions in the patterned media.

A data sector format of the magnetic recording medium may have record regions which are formatted in an order of a region for write-clock generation and a data region from a top of a data sector. And, in writing into the region for write-clock generation, the voltage generated between both terminals of the magnetic field generating coil may be measured. Further, the data sector format of the magnetic recording medium may have a region for read-clock generation between the region for write-clock generation and the data region, and, in this case, the recording element records patterns having a constant period in the region for read-clock generation.

It is to be noted that, in the above structure, a write clock frequency and information of phase shift from the top of the data sector in each data sector may be obtained and recorded in the magnetic recording medium or a memory in the magnetic recording apparatus, and the write clock frequency and the information of phase shift from the top of the data sector may be read when recording in the data sector of the magnetic recording medium is performed, to generate a write clock signal. Further, in the above method, detection of the change in coil inductance may be performed at a lower number of rotation of the magnetic recording medium than a number of rotation of the magnetic recording medium in recording and reproduction of data in a state of actual use of the magnetic recording apparatus, and the write clock frequency and the information of phase shift from the top of the data sector, which are obtained from the measurement result at the lower number of rotation, may be corrected so as to adjust with those at the number of rotation in the actual use of the magnetic recording apparatus, to generate a write clock signal. By obtaining information on an appropriate timing for recording in a state that the medium rotates at a low rate, it is possible to generate a write clock signal more accurately.

According to the magnetic recording apparatus of the embodiment, there is an effect that it is possible to generate an clock signal having both of a optimum frequency and a optimum phase with respect to a patterned magnetic body.

Further, there is an effect that it is possible to generate a clock signal in real time at the time of a recording operation without previously measuring an optimum clock signal, so that the apparatus becomes adaptable to an environmental change and the like and its performance improves.

Moreover, also in the case that the clock frequency and the information of phase shift for generating a clock signal are obtained in advance, it is possible to relatively easily and accurately obtain those information.

The object and advantages of the invention are realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

Figure 1:
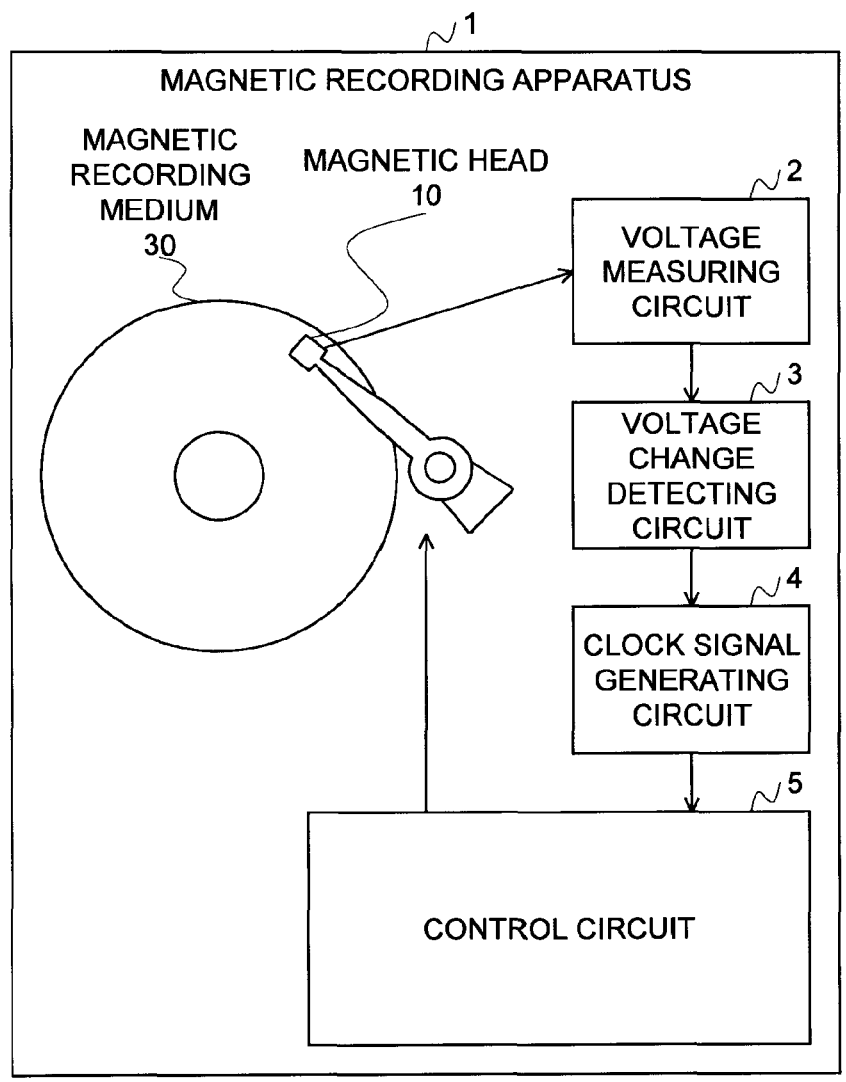
FIG. 1 is a view illustrating an outline of the embodiment.

FIG. 1 is a view illustrating an outline of the embodiment. A magnetic recording apparatus 1 is an apparatus provided with a magnetic recording medium 30 which is a patterned media system, in other words, patterned so as to physically section recording bits from adjacent bits.

A voltage measuring circuit 2 is a circuit which measures a voltage (coil voltage) generated between both terminals of a magnetic field generating coil in a recording element of a magnetic head 10. The coil voltage is measured by a control circuit 5 simultaneously with DC writing in a region for write-clock generation in a data sector format of the magnetic recording medium 30. A voltage change detecting circuit 3 detects a change in the coil voltage, which is measured by the voltage measuring circuit 2, and generates a clock pulse based on the detected voltage change. A clock signal generating circuit 4 generates a write clock signal which synchronizes with the clock pulse generated by the voltage change detecting circuit 3, and supplies the generated signal to the control circuit 5. The control circuit 5 generates a recording signal which synchronizes with the write clock signal outputted by the clock signal generating circuit 4, and controls recording into the magnetic recording medium 30, according to a recording command from an upper-level apparatus to the magnetic recording medium 30.

Figure 2:
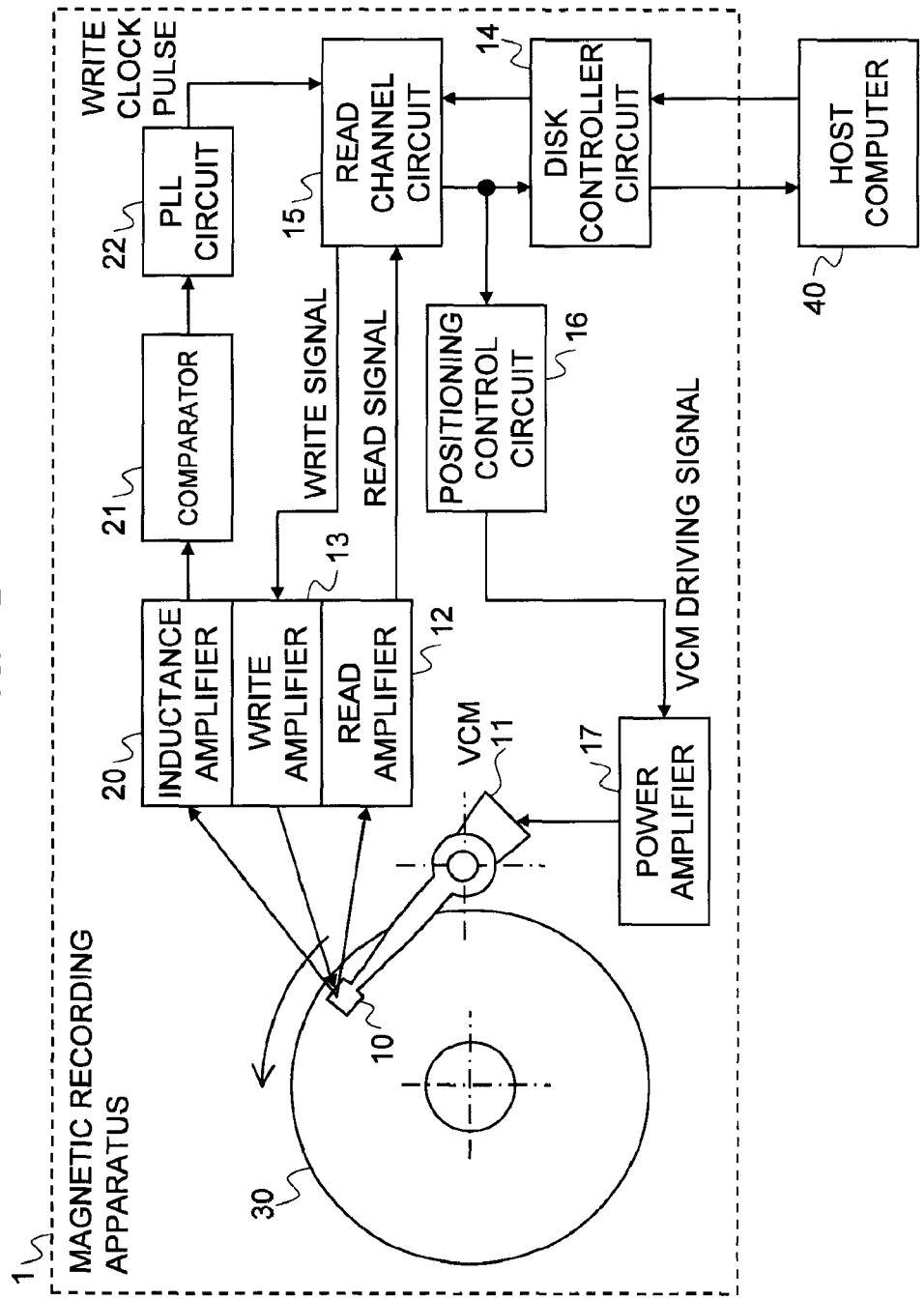
FIG. 2 is a control block diagram of a first embodiment.

FIG. 2 is a view illustrating a structure of a magnetic recording apparatus according to the embodiment. The magnetic recording apparatus 1 illustrated in FIG. 2 is a magnetic disk apparatus including a magnetic recording medium, which adopts a sector servo system and is formed by the patterned media.

As illustrated in FIG. 2, this magnetic recording apparatus 1 is formed by the following:

(a) a magnetic recording medium 30 of the patterned media system, patterned so as to physically section recording bits from adjacent bits;

(b) a magnetic head 10 that has a recording element and a reproduction device, and records and reproduces information in close vicinity to the magnetic recording medium 30;

(c) a head positioning mechanism 11 that positions the magnetic head 10 in an arbitrary radial position on the magnetic recording medium 30;

(d) a read amplifier 12 that voltage-converts a reproduction signal from the reproduction device of the magnetic head 10 into a reproduction signal;

(e) a write amplifier 13 that drives the recording element of the magnetic head 10 according to a write signal;

(f) a disk controller circuit 14 that receives a record or reproduction command from a host computer 40, calculates and controls a signal to be recorded in the magnetic recording medium 30, or returns a reproduced data signal from the magnetic recording medium 30 to the host computer 40 as a data bit string;

(g) a read channel circuit 15 that demodulates the reproduction signal from the magnetic recording medium 30 to generate a data signal or a servo signal, or modulates the data signal received from the disk controller circuit 14 in a manner appropriate for recording in the magnetic recording medium 30, to generate a record signal which synchronizes with a write clock pulse;

(h) a positioning control circuit (VCM control circuit) 16 that outputs a control signal for positioning the magnetic head 10 in a prescribed radial position based on the servo signal demodulated in the read channel circuit 15;

(i) a driving circuit (power amplifier) 17 that converts a VCM drive signal outputted from the positioning control circuit 16 into a current, to drive the head positioning mechanism 11;

(j) an inductance amplifier 20 (corresponding to the voltage measuring circuit 2 in FIG. 1) that measures the coil voltage in the recording element of the magnetic head 10;

(k) a comparator 21 (corresponding to the voltage change detecting circuit 3 in FIG. 1) that slices the coil voltage, and then generates a clock pulse; and (l) a PLL (Phase Locked Loop) circuit 22 (corresponding to the clock signal generating circuit 4 in FIG. 1) that generates a write clock pulse which synchronizes with the clock pulse.

Figure 3:
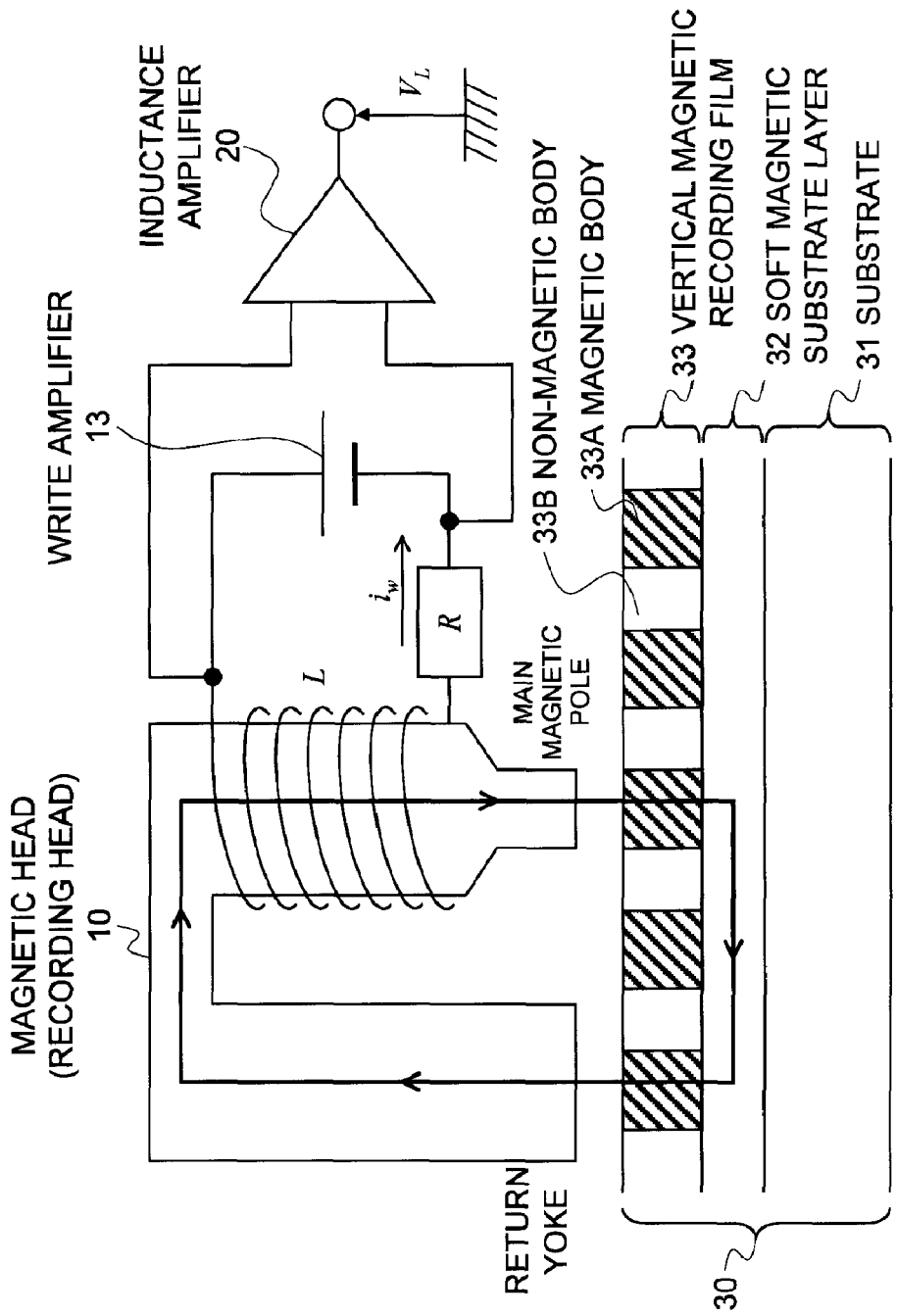
FIG. 3 is a schematic view of a magnetic head and a circuit for measuring a voltage generated at a coil.

The way that the inductance amplifier 20 detects the magnetic body region of the patterned media in FIG. 2 is described using FIG. 3.

FIG. 3 is a schematic view of the magnetic head and the circuit for measuring a the coil voltage, and illustrates the recording element (recording head) of the magnetic head 10, the magnetic recording medium 30, and the inductance amplifier 20 in FIG. 2.

The magnetic recording medium 30 is a recording medium of a vertical recording system, and has a structure in which a soft magnetic substrate layer 32 is formed under a vertical magnetic recording film 33, both of which are formed on a substrate 31. Thus, a magnetic circuit is formed between the recording element of the magnetic head 10 and the substrate 31, so that the recording efficiency is improved.

The recording element of the magnetic head 10 has a mono-magnetic pole structure, and has a structure in which the magnetic field passed through the soft magnetic substrate layer 32 is returned to a return yoke when a magnetic field is vertically applied to the magnetic recording medium 30. This recording element of the magnetic head 10 generates a magnetic field by applying a current to a coil winded around a core. A current $i_w$ flowing through the coil is supplied by the write amplifier 13.

Here, a coil inductance L changes depending upon whether or not the magnetic body is present immediately under a main magnetic pole. This is described using FIG. 4.

Figure 4:
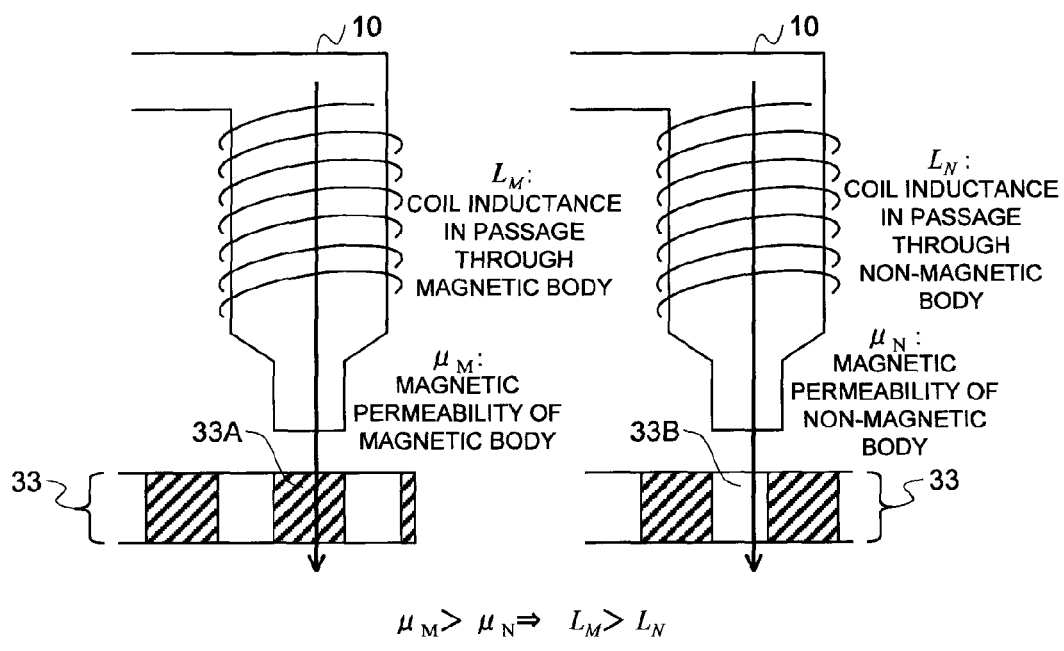
FIG. 4 is a view explaining a principle of a change in coil inductance on a patterned media.

FIG. 4 is a view explaining a change in coil inductance in the patterned media. A view on the left of FIG. 4 illustrates an example of a case where a magnetic body 33A is present immediately under the main magnetic pole. A view on the right of FIG. 4 illustrates an example of a case where a non-magnetic body 33B is present immediately under the main magnetic pole.

"$\mu_M$" represents a magnetic permeability of the magnetic body 33A in the vertical magnetic recording film 33, and "$\mu_N$" represents a magnetic permeability of the non-magnetic body 33B in the vertical magnetic recording film 33, where $\mu_M > \mu_N$. Changing of part of a magnetic permeability transmission channel included in the magnetic circuit is equivalent to changing of a magnetic permeability of the coil core. Thus, it is considered that a coil inductance $L_M$ in passage over the magnetic body is larger than a coil inductance $L_N$ in passage over the non-magnetic body. Therefore, by detecting a change in coil inductance in a case that a constant current is applied, it is possible to detect a timing of passage over the magnetic body region 33A and the portion of the non-magnetic body region 33B.

As illustrated in FIG. 3, an output $V_L$ of the inductance amplifier 20 is illustrated by a sum of a coil resistance R and a rate of change in magnetic flux $[d(Li_w)/dt]$.

Assuming that the write amplifier 13 is a constant current source, a temporal change $(di_w/dt)$ in current is considered to be zero, and thereby:

$$V_L = Ri_w - d(Li_w)/dt \quad (1)$$
$$= Ri_w - (dL/dt)i_w - L(di_w/dt) \quad (2)$$
$$= (R - dL/dt)i_w \quad (3)$$

Namely, the voltage (coil voltage) $V_L$, which is generated between both terminals of the magnetic field generating coil, is obtained by adding an offset voltage determined by the coil resistance R with a voltage determined by the change in coil inductance.

This method of detecting the change in coil inductance to generate a clock pulse is described with reference to FIG. 5. The main magnetic pole of the recording element of the magnetic head 10, which is driven by a constant current, traces on a recording track of the magnetic recording medium 30 of the patterned media system. Then, a change occurs in coil inductance, as illustrated in reference numeral 501 of FIG. 5.

Figure 5:
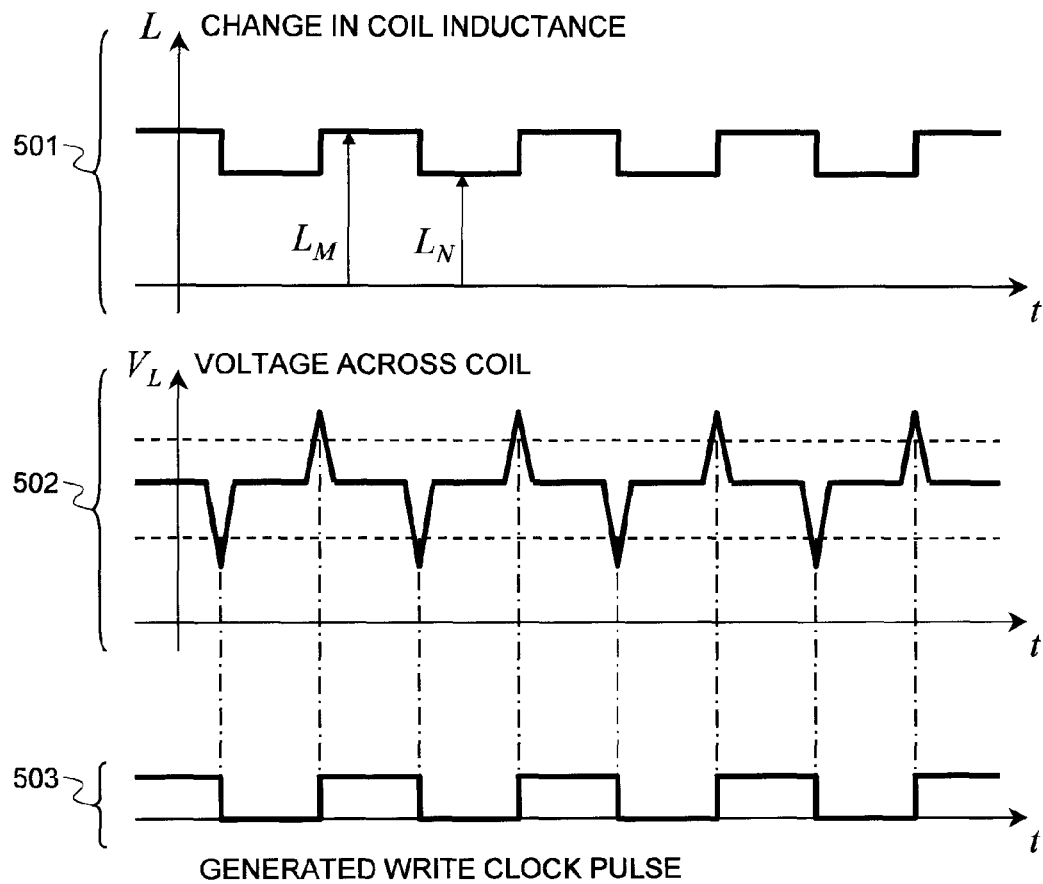
FIG. 5 is a schematic view of waveforms of equations for a principle of generation of a write clock pulse with time.

At this time, according to the equation (3) above, the coil voltage $V_L$ is detected in the inductance amplifier 20, and is outputted in impulse form according to the change in coil inductance, as illustrated in reference numeral 502 of FIG. 5.

Then, the coil voltage $V_L$ is sliced by a bipolar comparator, so that a write clock pulse signal corresponding to the change in coil inductance can be generated, as illustrated in reference numeral 503 of FIG. 5.

The PLL circuit 22 in FIG. 2 generates a write clock pulse which synchronizes with this clock pulse signal. The read channel circuit 15 outputs a write signal according to the write clock pulse, so that it is possible to accurately record data on a magnetic film of the magnetic recording medium 30 of the patterned media system.

Figure 6:
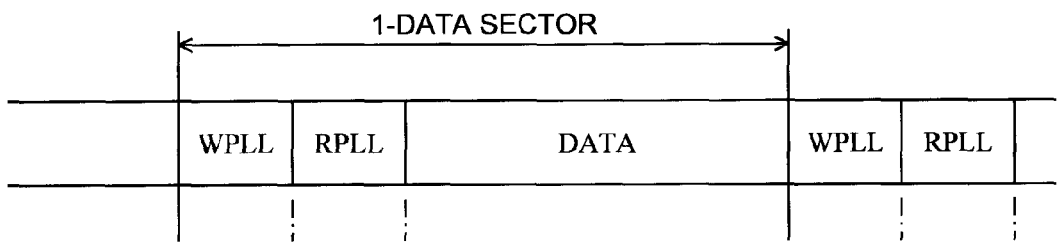
FIG. 6 is a view illustrating an example of a data sector format of the embodiment.

Next described is a procedure for recording and reproducing data in the magnetic recording apparatus 1 according to the structure of the embodiment. FIG. 6 is a data sector format for recording and reproducing data in the magnetic recording apparatus 1 according to the structure of the embodiment. The data sector is configured to have at its head a DC magnetization region WPLL for write-clock generation, and subsequently have a preamble region RPLL for read-clock generation, and a data region DATA.

Figure 7:
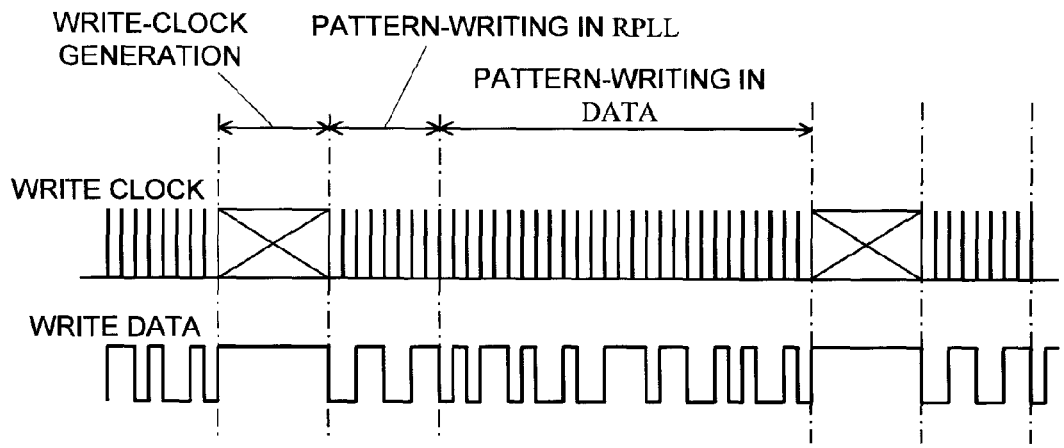
FIG. 7 is a time chart for a write operation.

FIG. 7 is a time chart for a write operation. The recording element of the magnetic head 10 is positioned on a target data track. In this state, the write amplifier 13 applies a DC current to the recording element of the magnetic head 10 at the top of the data sector, in other words, at the region WPLL. Thus, as described above, the change in coil inductance is detected, and a write clock pulse is generated by the PLL circuit 22 (write-clock generation).

Subsequently, according to the generated write clock, patterns having a constant period is recorded in the region RPLL (pattern-writing in RPLL). Finally, according to the generated write clock, data pattern is recorded in the region DATA.

Figure 8:
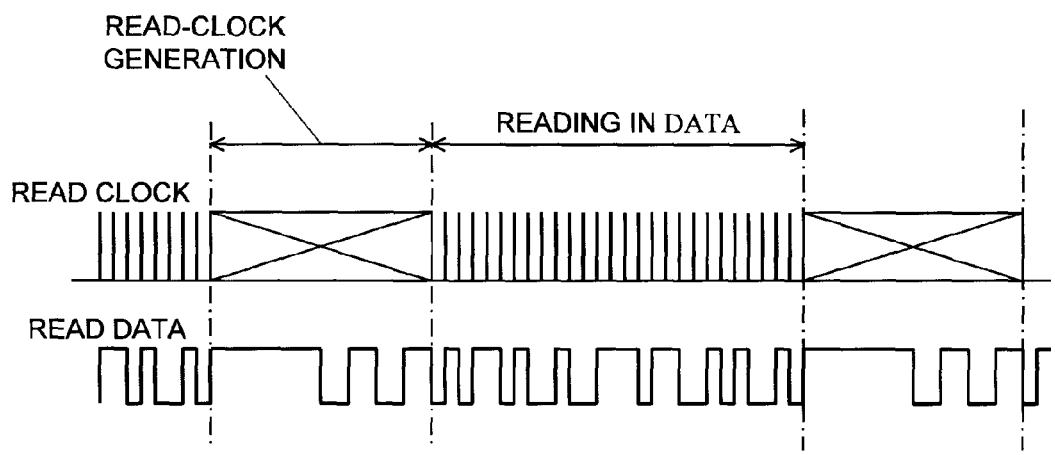
FIG. 8 is a time chart for a read operation.

FIG. 8 is a time chart for a read operation. The reproduction device of the magnetic head 10 is positioned on a target data track. In this state, the DC pattern recorded at the time of write-clock generation is reproduced at the top of the data sector, in other words, at the region WPLL. And, at the subsequent reproduction region RPLL, the read clock recorded at the time of data-writing is reproduced. By synchronizing with this read clock, it is possible to read accurately the data pattern in the region DATA.

Figure 9:
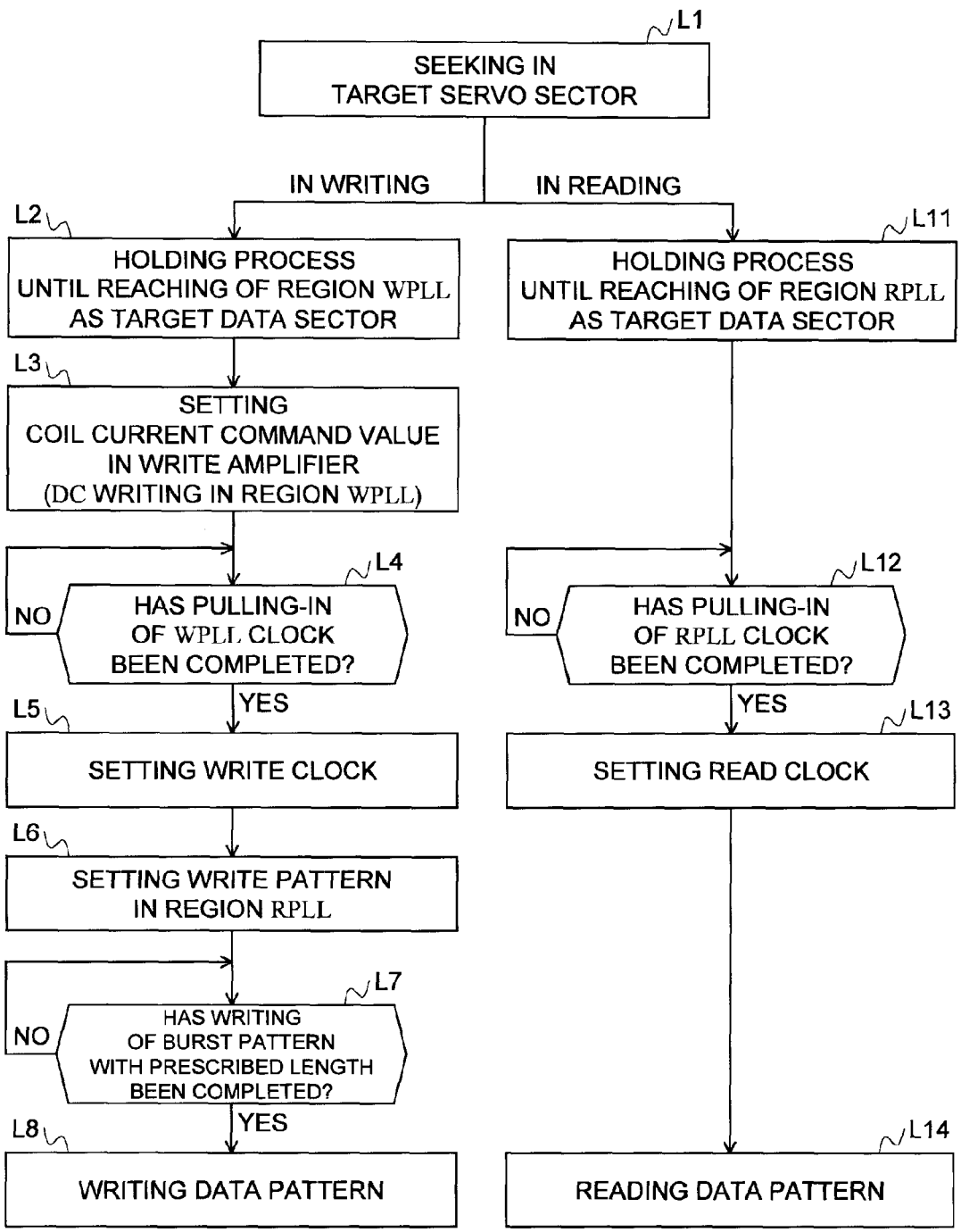
FIG. 9 is a flowchart at the time of sector-writing/reading.

FIG. 9 is a flowchart at the time of sector-writing/reading. In the present embodiment described are flows of procedures in writing and reading in a desired data sector.

First, a seek operation is performed by the magnetic head on a servo sector upstream from the desired data sector. This operation is common between the writing and reading (L1).

Subsequently, operations in writing are as in L2 to L8. After the completion of the seek on the desired servo sector is checked, the magnetic disk medium rotates, and then a waiting process is executed until the magnetic head 10 reaches the head of the target data sector (L2).

Upon reaching of the head of the target data sector, in other words, the region WPLL, a constant coil-current command value is given to the write amplifier 13. With this value given, the DC writing is performed in the region WPLL of the target data sector (L3).

As described later with referring to FIG. 12, it is determined that the output of the PLL circuit 22 is fixed, and pulling-in of the region WPLL clock is completed (L4), whereby a frequency and a phase of the write clock are set (L5).

Using the set write clock, a burst pattern for pulling-in a read clock is written in the region RPLL of the data sector (L6). The process is held until completion of writing of the burst pattern with a prescribed length (L7). Subsequently, the data pattern is written (L8).

Further, operations in reading are as in L11 to L14. A waiting process is executed until reaching of the target data sector to the region RPLL after passage over the region WPLL (L11). Next, a read clock is pulled-in according to the burst pattern written in the region RPLL (L12). Thereby, a frequency and a phase of the read clock are set (L13). According to the set read clock, data pattern that subsequently appears is read (L14).

Figure 10:
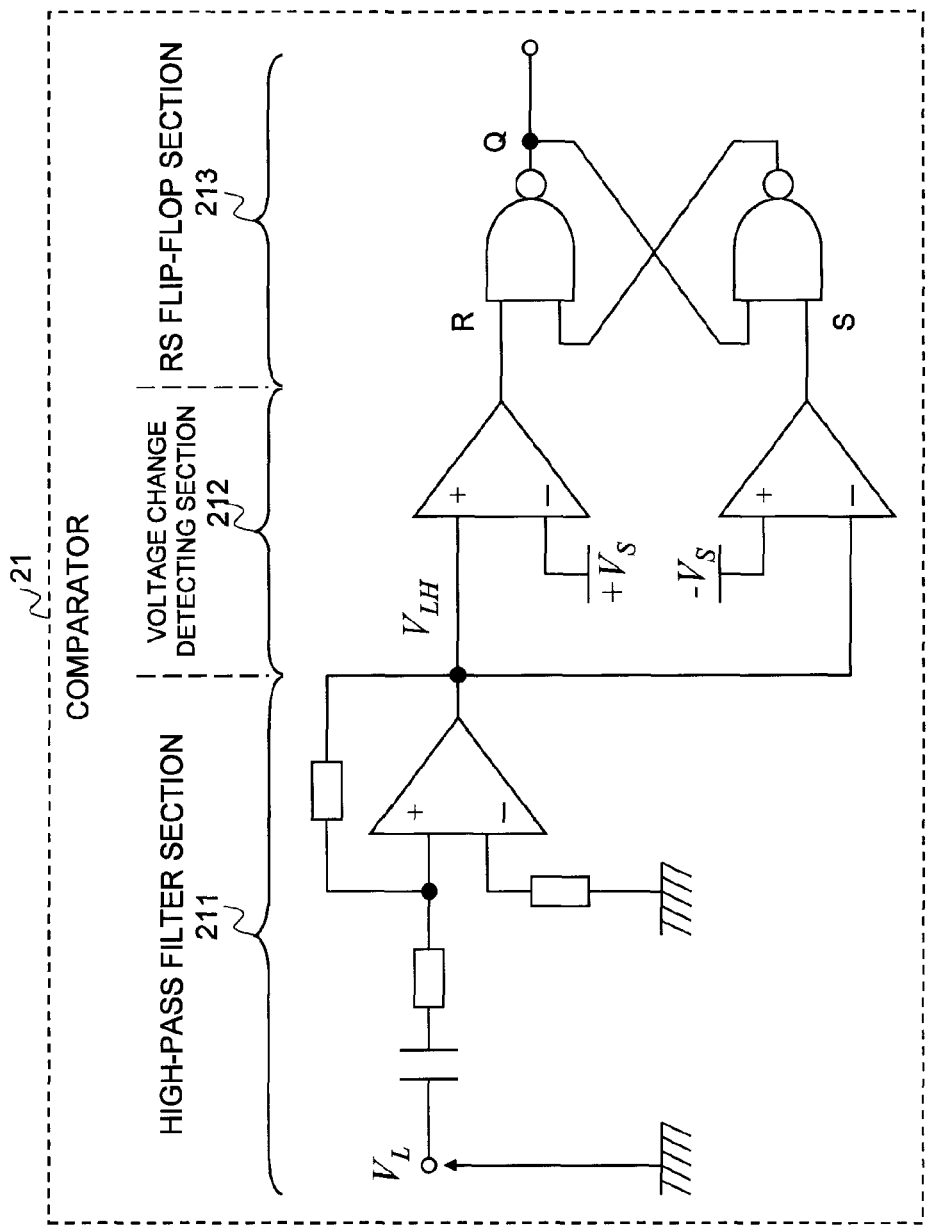
FIG. 10 is a detailed circuit view of a comparator.
Figure 11:
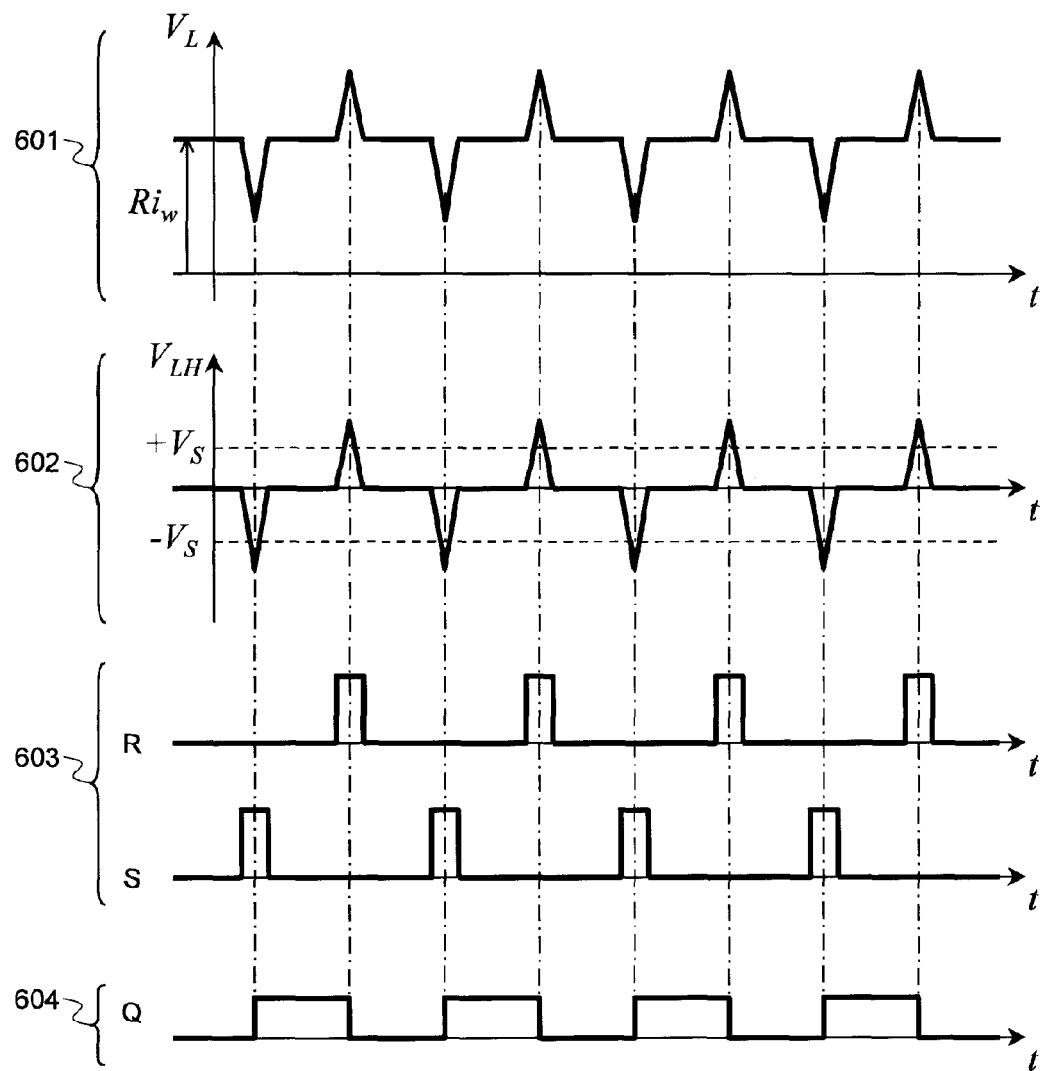
FIG. 11 is a waveform view of each stage of the comparator.

FIG. 10 illustrates a detailed circuit view of the comparator 21. Further, FIG. 11 illustrates a waveform of each stage of the comparator 21.

The circuit of the comparator 21 in the present example is mainly sectioned into three blocks, in other words, a high-pass filter section 211, a voltage change detecting section 212, and an RS flip-flop section 213.

The high-pass filter section 211, which is a prestage of the comparator 21, has the function of eliminating a DC component of an output $V_L$ of the inductance amplifier 20:

$$V_L = (R - dL/dt)i_w,$$

to obtain:

$$V_{LH} = (-dL/dt)i_w.$$

Assuming that a waveform of $V_L$ before removal of the DC component is as illustrated in a waveform 601 of FIG. 11, a waveform of $V_{LH}$ after removal of the DC component becomes as illustrated in a waveform 602 of FIG. 11.

Subsequently a circuit of the voltage change detecting section 212 is provided. The voltage change detecting section 212 detects a height of an impulse waveform by using a positive/negative comparator to detect a timing of occurrence of a change in inductance. For example, by setting of the voltages to be compared in the comparator to +Vs and −Vs, a signal R is outputted which illustrates the timing of $V_{LH}$ exceeding +Vs, and a signal S is outputted which illustrates the timing of $V_{LH}$ falling below −Vs, as illustrated in a signal diagram 603 of FIG. 11.

The circuit of the RS flip-flop section 213 is provided as poststage of the comparator 21, and, as illustrated in a signal diagram 604 of FIG. 11, is operated such that an output Q is "Low" when the signal R is "High", and the output Q is "High" when the signal S is "High".

In the above-mentioned manner, a pulse signal which synchronizes with the inductance change can be obtained in the circuit of the comparator 21.

Figure 12:
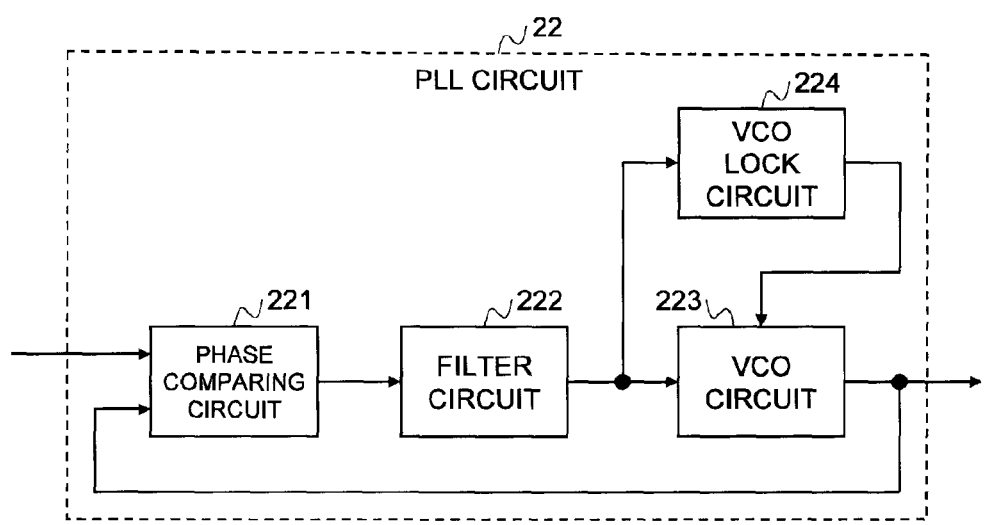
FIG. 12 is a block diagram of a PLL circuit.

FIG. 12 is a block diagram of the PLL circuit 22. As illustrated in FIG. 12, the PLL circuit 22 is formed by four blocks: a phase comparing circuit 221, a filter circuit 222, a VCO circuit 223, and a VCO lock circuit 224.

First, a clock signal generated in the comparator 21 is inputted into the phase comparing circuit 221, and compared with an output of the PLL circuit 22 (output of the VCO circuit 223, described later). Then, when the above two inputs have an equal frequency and have a relation of which they have different phases with a 90-degree, the signal is outputted from which their DC components are removed.

Next, a phase-compared signal is filtered by the filter circuit 222. The filter circuit 222 acts exclusively to remove a high frequency component, and outputs an difference between input and output of the PLL circuit 22 as a DC error signal. The filter circuit 222 may take varies structure, which depends on what is an aim of a designer.

The VCO circuit 223 is an oscillator that outputs a pulse with a frequency proportional to a change in input voltage. The VCO lock circuit 224 serves to estimate the output of the filter circuit 222, determines that its value is concluded within a desired range, and then fixes an oscillating frequency of the VCO circuit 223.

With the above structure, a pulse which synchronizes with the output of the comparator 21 can be generated by the PLL circuit 22.

Next, a second embodiment is described. In a test process before factory shipment, by use of the foregoing method, the optimum write clock frequency and the information of phase shift for each data sector are previously measured and written in a nonvolatile memory in the apparatus or the end section of the system area or the servo sector on the magnetic recording medium 30.

In performing the write operation, these information are read before recording in the data sector is actually performed, the frequency is set, the phase shift is corrected. Thus, the optimum write clock signal is generated.

Figure 13:
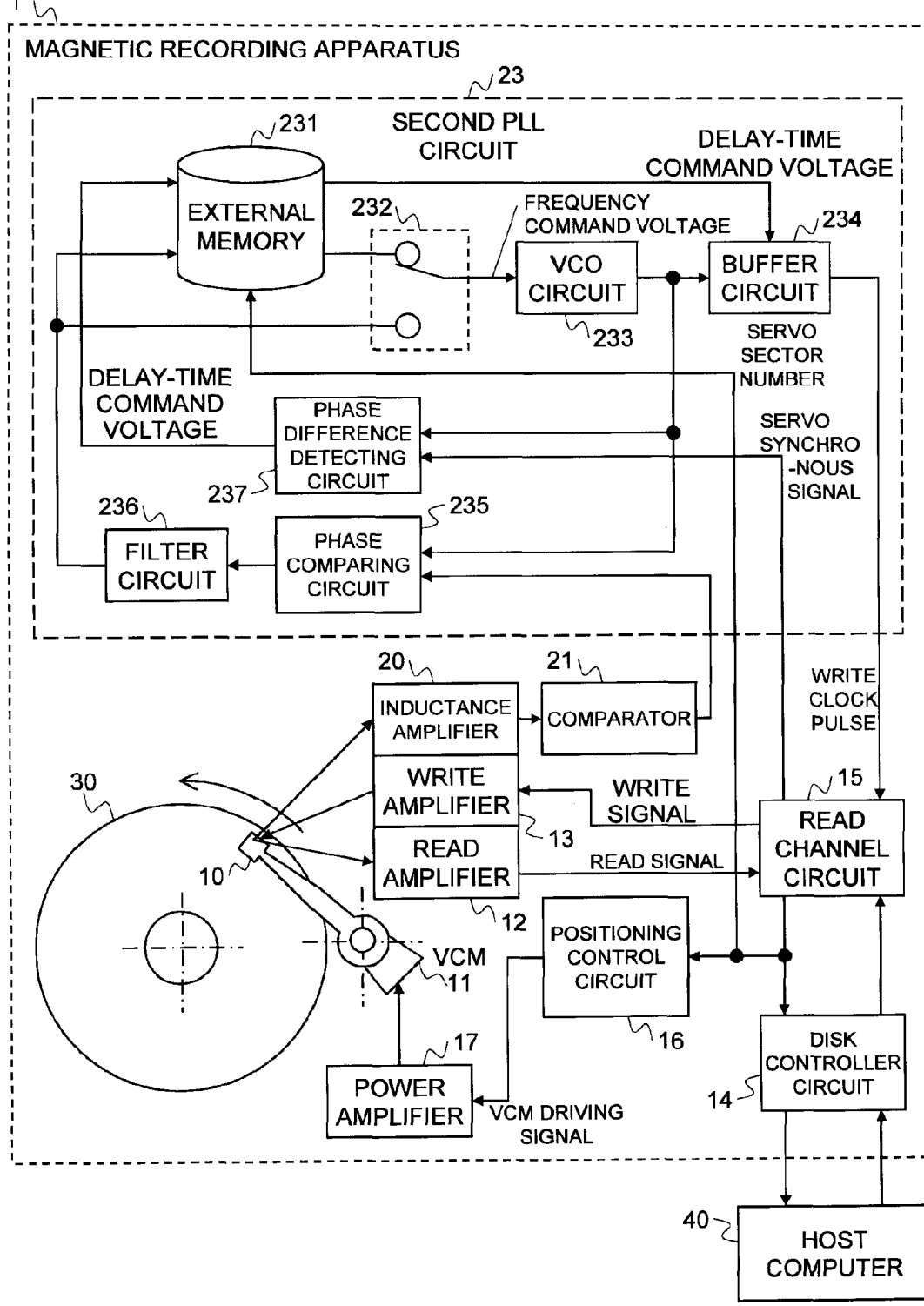
FIG. 13 is a control block diagram of a second embodiment.
Figure 14:
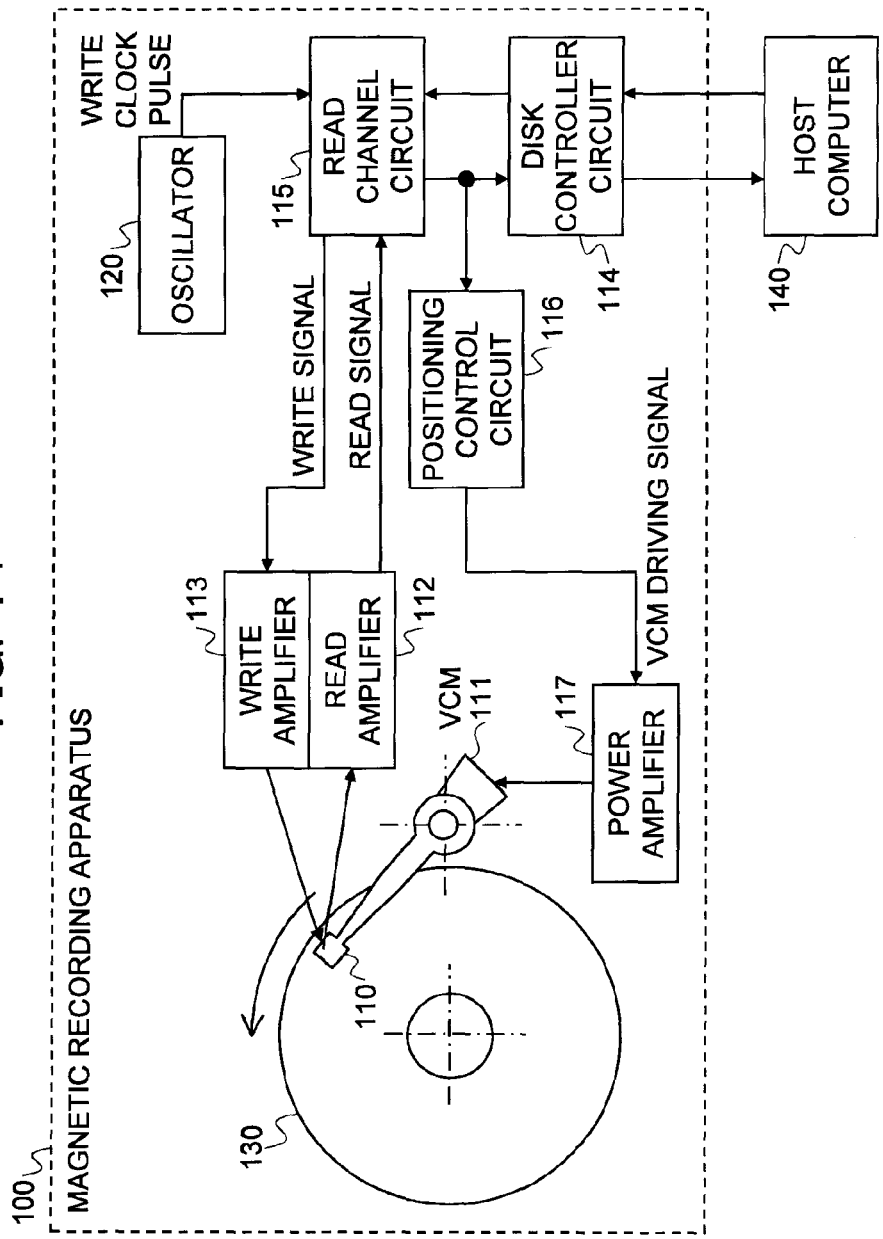
FIG. 14 is a control block diagram of a conventional apparatus.

FIG. 13 is a control block diagram of the second embodiment. In the following, a structure for realizing the second embodiment is described. In FIG. 13, the second PLL circuit 23 is one having replaced the PLL circuit 22 in FIG. 2. The other sections respectively have similar functions to those with the same numerals illustrated in FIG. 2.

The second PLL circuit 23, which is similar with the PLL circuit 22, receives a pulse signal from the comparator 21, and outputs a write clock pulse to the read channel circuit 15. However, the second PLL circuit 23 is different in a point that it uses partial offline processing by using the external memory 231, and a point that, due to the use of the offline processing, a servo sector number and a servo synchronous signal are received from the read channel circuit 15. In the following, the second PLL circuit 23 is described in detail.

At the time of the write operation, a write clock pulse to be supplied to the read channel circuit 15 is generated from frequency data and delay-time data corresponding to each servo sector, both of which are stored in the external memory 231 in the second PLL circuit 23. As described with the flowchart of FIG. 9, in the write operation, access is firstly made to a desired servo sector. By this access, the external memory 231 is referred to by the servo sector number demodulated in the read channel circuit 15, and frequency data and delay-time data are obtained which are appropriate for a data sector that appears subsequently to the above servo sector.

At the time of the write operation, the switch 232 is connected to the external memory 231 side, and a frequency command voltage is inputted into the VCO circuit 233. The VCO circuit 233 outputs a pulse signal with a frequency proportional to the input voltage, and the pulse signal is inputted into the buffer circuit 234. Further, delay-time data in a specified servo sector is inputted from the external memory 231 into the buffer circuit 234. In the buffer circuit 234, a pulse waveform from the VCO circuit 233 is delayed by the specified delay-time, and outputted as a write clock pulse to the read channel circuit 15.

A procedure for writing the frequency data and the delay-time data corresponding to the servo sector number in the external memory 231, which is required in the foregoing write operation, is described.

First, the input into the switch 232 is previously switched to an output from a filter circuit 236 having filtered an output of a phase comparing circuit 235. A seek operation is performed on the specified servo sector, and the sequence from L1 to L5 in the flowchart of FIG. 9 is performed. As a result, the optimum write clock frequency in the specified servo sector is obtained, and is written in the external memory 231. Further, a phase difference between a servo synchronous signal detected in the servo sector and the output of the VCO circuit 233 is detected in the phase difference detecting circuit 237, and the obtained value is written in the external memory 231.

According to the above operation, the write clock frequency and delay-time, which are optimum for a data sector that appears subsequently to the servo sector number, can be obtained and stored in the external memory 231.

Such an operation is performed on every servo sector on the magnetic recording medium 30 while the servo sector number changes. And, a write clock frequency and delay-time, both of which are optimum for each servo sector, are previously stored in the external memory 231.

The write operation into the external memory 231 at this time is performed only once before factory shipment of the apparatus, for example. This makes it possible to omit performing the write clock synchronization in the region WPLL of the data sector in a data-writing operation after shipment, and thus to use the region WPLL in the first embodiment as a region for storing data.

In the case of making access to the data sector, after the seek operation is performed on a servo sector representing the data sector, the process is held waiting for the magnetic recording medium 30 to rotate until reaching of the data sector that subsequently appears (cf. L1, L2 of FIG. 9).

In the second embodiment, the external memory 231 stores servo sector numbers as indexes, optimum write clock frequencies for a group of successive data sectors which is represented by the servo sector numbers, and delay-time for the group. The delay-time is a deviation between a synchronous signal included in the servo sector and the clock of the data sector.

The external memory 231 above described may be a non-volatile semiconductor memory, or may be the magnetic recording medium 30 which performs magnetic recording.

Finally, a third embodiment is described. The method of acquiring information on optimum-clock generation before factory shipment and employing this after shipment is the same as in the second embodiment. However, in this embodiment, the change in coil inductance is detected in a state that the number of rotation of the magnetic recording medium 30 is lowered at the processing for acquirement of information for the optimum-clock generation, in other words, at a time of the operation to detect a coil inductance before shipment. This makes it possible to lower a frequency of a signal of the coil voltage.

Thus, it becomes possible to more accurately detect changes in inductance in the magnetic body regions and the non-magnetic body regions. Namely, in the third embodiment, the number of rotation of the magnetic recording medium 30 is lowered at the time of the write operation on the external memory 231, so that it is possible to perform more accurate measurement of optimum write clock frequency and delay-time.

In each of the first, second and third embodiments, the description was given provided that the apparatus was described on the assumption of the vertical magnetic recording system, but any of these embodiments may be applied to a horizontal magnetic recording system.

Each embodiment discloses a magnetic recording apparatus having a magnetic recording medium of a patterned media system, which is used as an external storage apparatus of a computer system, and is particularly a technique which makes it possible to accurately record data at the center of each of magnetic body regions sectioned with non-magnetic body regions.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present inventions have been described in detail, it should be understood that the various changes, substitutions, and alterations could be made hereto without departing from the sprit and scope of the invention.

What is claimed is:

1. A magnetic recording apparatus comprising:
    a magnetic recording medium provided with a plurality of recording dots physically sectioned with each other;
    a recording element having a magnetic field generating coil, and recording data in the magnetic recording medium;
    a voltage measuring circuit measuring a voltage generated between both terminals of the magnetic field generating coil;
    a voltage change detecting circuit detecting a change of the voltage to generate a clock pulse based on the change of the voltage; and
    a clock signal generating circuit generating a write clock signal which synchronizes with the clock pulse.

2. The magnetic recording apparatus according to claim 1, wherein the magnetic recording medium comprises record regions which are formatted in an order of a region for write-clock generation and a data region from a top of a data sector.

3. The magnetic recording apparatus according to claim 2, wherein the recording element performs DC writing in the region for write-clock generation, and the voltage measuring circuit measures a voltage generated between both terminals of the magnetic field generating coil when the recording element performs the DC writing in the region for write-clock generation.

4. The magnetic recording apparatus according to claim 3, wherein the magnetic recording medium further comprises a region for read-clock generation between the region for write-clock generation and the data region, and the recording element records patterns having a constant period in the region for read-clock generation.

5. A method for generating a write clock signal that gives a timing for recording data in a magnetic recording medium provided with a plurality of recording dots physically sectioned with each other, the method comprising:
    measuring a change in inductance of a magnetic field generating coil from a voltage generated between both terminals of the magnetic field generating coil of a recording element that performs recording in the magnetic recording medium;
    detecting a passage timing of the recording element on a magnetic body region in a recording bit position on the magnetic recording medium based on the change in inductance; and
    generating a write clock signal which synchronizes with the passage timing.

6. The clock signal generating method according to claim 5, wherein the voltage generated between both terminals of the magnetic field generating coil is measured when the recording element performs DC writing in the magnetic recording medium.

7. The clock signal generating method according to claim 6, wherein a number of rotation of the magnetic recording medium when the voltage generated between both terminals of the magnetic field generating coil is measured is lower than a number of rotation of the magnetic recording medium in when the data are recorded in a data sector of the magnetic recording medium.

* * * * *